Patented Aug. 18, 1942

2,293,454

UNITED STATES PATENT OFFICE 2,293,454

AMINOPLAST CONTAINING A HALOGENATED AMIDE

Gaetano F. D'Alelio, Pittsfield, Mass., assignor to General Electric Company, a corporation of New York No Drawing. Application August 2, 1939, Serial No. 288,033

16 Claims. (Cl. 260—72)

This invention relates broadly to resinous compositions. More particularly it is concerned with a novel method of converting soluble fusible aminoplasts to the insoluble infusible state and with the improved laminating and molding compositions produced by the method. As is well known, aminoplasts are synthetic resin prepared from amino or amido compounds, a typical example being urea-formaldehyde resin.

In producing laminated and molded articles from aminoplasts, the common practice has been to incorporate into the resin or into the laminating or molding composition a direct (active) curing catalyst, for example an organic or inorganic acid, or a latent curing catalyst. The latter generally is understood to be a substance which, under the influence of heat or heat and pressure, functions at some threshold temperature as a curing agent for the resin. Substituted halogenated aromatic acid bodies, which break down under the influence of heat to give more highly acid products, have been proposed heretofore as latent curing catalysts of aminoplasts. Salts of alpha or beta halogenated aliphatic acids also have been suggested for this purpose.

The latent curing agents or catalysts for aminoplasts heretofore used or suggested have had certain disadvantages. Molding compositions in which is incorporated any type of acidic body have a limited time and heat stability. In many electrical applications the presence of salts is undesirable and the addition of salts therefore must be kept at a minimum. The use of salts as curing catalysts is especially undesirable when salts or salt-forming materials have been used in producing the initial urea-aldehyde condensation product, as the total concentration of salts then present results in molded articles of inferior electrical characteristics. When salts are used as curing catalysts, articles of unsatisfactory appearance sometimes are obtained, due to the fact that most materials of a salt nature are substantially insoluble in urea-aldehyde resinous condensation products.

I have discovered that new and useful resinous compositions and improved laminating and molding compositions can be prepared by incorporating into a normally non-curing (potentially heat-curable) aminoplast, as an accelerator of curing, a halogenated amide of a secondary amine, which amide has at least one halogen attached to the alpha or the beta carbon atoms, e. g., an alpha chlorinated amide of a secondary amine, a beta chlorinated amide of a secondary amine, an alpha beta chlorinated amide of a secondary amine. Such curing catalysts contain no salt groups and therefore yield molding compositions and molded articles which are free from the disadvantages resulting from the use of latent curing catalysts of the salt type. They are readily soluble in the urea-aldehyde condensation product and therefore make possible the production of molding compositions and molded articles of substantially uniform properties in the same piece and from batch to batch. Further, they contain no aldehyde-reactable groups and therefore cannot inter-condense with the other components (e. g., urea and aldehyde) of the aminoplast.

In carrying the present invention into effect the substituted amides of secondary amines which are used may have halogen attached to the alpha carbon atom, the beta carbon atom or to both the alpha and beta carbon atoms. More particularly these amides may be described as containing the amide grouping,

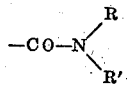

where R and R' are the same or different organic groupings capable of being attached to nitrogen. As illustrative of such groupings, it is mentioned that R and R' may be alkyl, aryl (including naphthyl), aralkyl, alkaryl, acyl, hydrocyclic, heterocyclic and the like. More specific examples of these groupings are: methyl, ethyl, propyl, butyl, amyl, phenyl, toluyl, pyrryl, furfuryl, aceto and cyclohexyl.

The urea component may be, for instance, urea ($NH_2CONH_2$) itself; thiourea iminourea (guanidine); aldehyde-reactable; substituted ureas, thioureas and iminoureas such as methyl urea, acetyl urea, benzoyl urea, phenyl thiourea, asymmetrical diethyl urea, allyl urea, 2-chloro-allyl urea, ethylidene urea, methylol urea, methylene urea, dicyanidiamide (cyano-iminourea), guanylurea, guanylthiourea, biguanidine, aminoguanidine, creatine (guanidine methyl glycine) and guanoline (guanido carbonic ethyl ester). The above compounds properly may be included within the term "a urea." Examples of other compounds that may be used in the production of aminoplasts are aminotriazoles, creatinine, ethylene pseudosulfocarbamide derivatives, sulforhydantoin and certain triazine derivatives.

The particular aldehyde which is used in making the improved aminoplast of this invention is dependent largely upon economic conditions and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aldehydes.

In order that those skilled in the art better may understand how this invention may be carried into effect the following examples are given by way of illustration. All parts are by weight.

Example I

|  | Parts |
|---|---|
| Urea | 60.0 |
| Aqueous ammonia (28%) | 15.0 |
| Aqueous formaldehyde (37.1%) | 160.0 |
| Sodium hydroxide in one part water | 0.04 |
| N-diethyl chloroacetamide | 1.18 |

All of the components with the exception of the N-dialkyl (specifically N-diethyl) chloroacetamide were refluxed for approximately one-half hour to form a resin syrup. The N-diethyl chloroacetamide was dissolved in this syrup. When this syrup was heated on a hot plate at 130 to 150° C. a clear, homogeneous, rapidly curing, continuous resin film of good water-resistance was obtained. If the halogenated amides used in practicing this invention are omitted from the above formulation a sticky, uncured, blistered resin which shreds and disintegrates in water is obtained.

Example II

|  | Parts |
|---|---|
| Halogenated amide-containing syrup of Ex. I | 20.0 |
| Alpha flock | 6.1 |
| Zinc stearate | 0.04 |

The above components were compounded to produce a molding composition which thereafter was dried for 4 hours at approximately 50° C. On subjecting the dried composition to a temperature of the order of 100° to 150° C., preferably from approximately 120° to 150° C., and under a pressure of the order of 1000 to 4000 pounds per square inch, well-cured molded articles were obtained. The molding compositions had good flow characteristics and when subjected to heat-stability tests, for example heating for 24 hours at 50 C., there was no loss of plastic flow or adverse effect on the curing rate.

The halogenated amide-containing resinous composition of this example also is particularly suitable for use in the production of laminated articles. For example, fibrous sheet material such as paper, cloth, etc., may be coated and impregnated with the resin syrup, the sheets dried and thereafter superimposed and subjected to heat and pressure to bond the sheets firmly together.

Molding compositions similar to that of this Example II, but containing no halogenated amide, gave, when molded under similar conditions, sticky, uncured, blistered articles. Continued heat treatment of the molding composition, for example, from 6 to 48 hours at 50 to 75° C., prior to molding, resulted in no improvement in the molded article.

Example III

|  | Parts |
|---|---|
| Urea | 60.0 |
| Hexamethylenetetramine | 17.5 |
| Aqueous formaldehyde (37.1%) | 150.0 |
| N-diethyl chloroacetamide | 1.14 |

All of the above components with the exception of the N-diethyl chloroacetamide were refluxed for approximately one-half hour to form a resin syrup. The N-diethyl chloroacetamide was dissolved in this syrup. Cured resins were produced as described under Example I and had the same general characteristics as the products of that example. This example is typical of the salt-less resins which may be produced in accordance with this invention.

Example IV

|  | Parts |
|---|---|
| Halogenated amide-containing syrup of of Example III | 20.0 |
| Alpha flock | 6.1 |
| Zinc stearate | 0.04 |

The above components were suitably mixed together to produce a molding composition which was dried for 4 hours at 50° C. Heat- and pressure-hardened articles made from this molding composition as described under Example II had the same general characteristics as the products of that example.

It will be understood, of course, that the particular halogenated amide, namely, N-diethyl chloroacetamide, mentioned in the above examples, is only by way of illustration and that any other alpha or beta or alpha and beta halogenated amides of a secondary amine may be used in carrying this invention into effect. As illustrative of such halogenated amides, I mention the following:

| Formula | Name |
|---|---|
| ClCH$_2$CON(CH$_3$)$_2$ | N-dimethyl-chloracetamide |
| ClCH$_2$CON(C$_3$H$_7$)$_2$ | N-dipropyl chloracetamide |
| ClCH$_2$CON(C$_4$H$_9$)$_2$ | N-dibutyl chloracetamide |
| ClCH$_2$CON(C$_5$H$_{11}$)$_2$ | N-diamyl chloroacetamide |
| ClCH$_2$CON(CH$_3$)(C$_6$H$_5$) | N-methyl N-phenyl chloracetamide |
| Cl$_2$CHCON(CH$_3$)$_2$ | N-dimethyl dichloracetamide |
| Cl$_2$CHCON(C$_2$H$_5$)$_2$ | N-diethyl dichloracetamide |
| Cl$_2$CHCON(C$_3$H$_7$)$_2$ | N-dipropyl dichloracetamide |
| Cl$_2$CHCON(C$_4$H$_9$)$_2$ | N-dibutyl dichloracetamide |
| Cl$_2$CHCON(C$_5$H$_{11}$)$_2$ | N-diamyl dichloracetamide |
| Cl$_3$C—CON(CH$_3$)$_2$ | N-dimethyl trichloracetamide |
| Cl$_3$C—CON(C$_2$H$_5$)$_2$ | N-diethyl trichloracetamide |
| Cl$_3$C—CON(C$_3$H$_7$)$_2$ | N-dipropyl trichloracetamide |
| Cl$_3$C—CON(C$_4$H$_9$)$_2$ | N-dibutyl trichloroacetamide |
| Cl$_3$C—CON(C$_5$H$_{11}$)$_2$ | N-diamyl trichloroacetamide |
| BrCH$_2$CON(CH$_3$)$_2$ | N-dimethyl bromoacetamide |
| BrCH$_2$CON(C$_2$H$_5$)$_2$ | N-diethyl bromoacetamide |
| BrCH$_2$CON(C$_3$H$_7$)$_2$ | N-dipropyl bromoacetamide |
| BrCH$_2$CON(C$_4$H$_9$)$_2$ | N-dibutyl bromoacetamide |
| BrCH$_2$CON(C$_5$H$_{11}$)$_2$ | N-diamyl bromoacetamide |
| Br$_2$CHCON(CH$_3$)$_2$ | N-dimethyl dibromoacetamide |
| Br$_2$CHCON(C$_2$H$_5$)$_2$ | N-diethyl dibromoacetamide |
| Br$_2$CHCON(C$_3$H$_7$)$_2$ | N-dipropyl dibromoacetamide |
| Br$_2$CHCON(C$_4$H$_9$)$_2$ | N-dibutyl dibromoacetamide |
| Br$_2$CHCON(C$_5$H$_{11}$)$_2$ | N-diamyl dibromoacetamide |

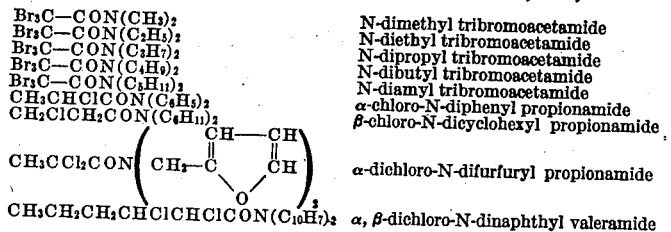

| | |
|---|---|
| $Br_3C-CON(CH_3)_2$ | N-dimethyl tribromoacetamide |
| $Br_3C-CON(C_2H_5)_2$ | N-diethyl tribromoacetamide |
| $Br_3C-CON(C_3H_7)_2$ | N-dipropyl tribromoacetamide |
| $Br_3C-CON(C_4H_9)_2$ | N-dibutyl tribromoacetamide |
| $Br_3C-CON(C_5H_{11})_2$ | N-diamyl tribromoacetamide |
| $CH_2CHClCON(C_6H_5)_2$ | α-chloro-N-diphenyl propionamide |
| $CH_2ClCH_2CON(C_6H_{11})_2$ | β-chloro-N-dicyclohexyl propionamide |
| $CH_3CCl_2CON(CH_2-C\overset{CH-CH}{\underset{O}{\diagdown\diagup}}CH)_2$ | α-dichloro-N-difurfuryl propionamide |
| $CH_3CH_2CH_2CHClCHClCON(C_{10}H_7)_2$ | α,β-dichloro-N-dinaphthyl valeramide |

It also will be understood that in each of the specific halogenated amides above mentioned the particular halogen shown in any specific example may be replaced by some other halogen, care being taken in a choice of a halogen in the light of the properties desired in the final products. For example, when light-colored molded articles are desired the use of iodoamides of secondary amines should be avoided and when the heat-convertible resins are to be used in the production of molding compositions the fluoroamides of secondary amines preferably are avoided.

Where a plurality of halogen atoms are present in the amide molecule these may be the same or different. For example, one halogen in the molecule may be chlorine and another bromine. In this way it is possible to obtain a heat-convertible aminoplast of controlled curing characteristic. The curing characteristics of the resin and of molding compositions made therefrom also may be controlled by using a mixture of two or more halogenated amides of secondary amines.

Although in the foregoing examples I have shown the halogenated amide as being introduced into the resin at the end of the initial condensation reaction, I am not limited to this specific procedure. For example, the halogenated amide may be added at the start of the condensation reaction or after the other components have partially reacted. Or, the halogenated amide may be mixed with the components of the molding composition at any convenient stage in the preparation of such compositions. Preferably, I incorporate the halogenated amide into the resin syrup as described in the illustrative examples.

The amount of halogenated amide of a secondary amide which is incorporated into the resin or into the molding composition may be varied considerably, depending largely upon the particular amide employed and the particular curing rates desired. In general, however, only a relatively small amount of halogenated amide is used, and preferably not exceeding substantially one-tenth mole of halogenated amide per mole of urea substance.

While I have described my invention with particular reference to the curing of urea-aldehyde condensation products, it will be understood of course that other modifying bodies may be introduced into the resin before, during, or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerol, pentaerythritol, trimethylol nitromethane, etc.; mono- or polyamides; amines; phenols; aminophenols; ketones; etc. The modifying bodies also may take the form of high molecular weight bodies, with or without resinous characteristics, for example lignin, partially hydrolyzed wood products, proteins, protein-aldehyde condensation products, phenol-aldehyde condensation products, polyhydric alcohol-polybasic acid condensation products, natural gums and resins, etc. Dyes, pigments, plasticizers, mold lubricants opacifiers and various fillers may be compounded with the resin in accordance with conventional practice to produce molding compositions and molded articles best fitted to meet a particular service application.

The modified or unmodified resinous compositions of this invention have a wide variety of uses. For example, in addition to their use in the production of molding compositions they may be employed in making protective surfacing materials, for example paints, varnishes, etc. They may be used in making arc-extinguishing tubes capable of evolving an arc-extinguishing gas under the heat of the arc, in the production of wire or baking enamels, and for bonding or cementing together mica flakes to form a laminated mica article. They also may be used as anti-creasing agents, as impregnants for electrical coils and other electrical devices, and for other purposes.

What I claim as new and desire to secure by Letters Patent of the United States is:

1. A composition of matter comprising a potentially heat-curable aminoplast and, as an accelerator of curing of said aminoplast, a halogenated amide selected from the class consisting of alpha halogenated amides of secondary amines, beta halogenated amides of secondary amines and alpha beta halogenated amides of secondary amines.

2. A composition of matter comprising a normally non-curing, alcohol-modified urea-aldehyde resin having incorporated therein as an accelerator of curing a halogenated amide selected from the class consisting of alpha halogenated amides of secondary amine, beta halogenated amides of secondary amines and alpha beta halogenated amides of secondary amines.

3. A heat-curable resinous composition comprising a potentially heat curable aminoplast and a curing catalyst for the said aminoplast, said catalyst being selected from the class consisting of alpha halogenated amides of secondary amines, beta halogenated amides of secondary amines and alpha beta halogenated amides of secondary amines.

4. A composition comprising a potentially heat-curable aminoplast having incorporated therein a curing accelerator comprising an alpha chlorinated amide of a secondary amine.

5. A composition comprising (1) a potentially heat-curable resinous condensation product of ingredients comprising urea and formaldehyde and (2) an accelerator of curing of said condensation product comprising a halogenated amide selected from the class consisting of alpha halogenated amides of secondary amines, beta halogenated amides of secondary amines and alpha beta halogenated amides of secondary amines.

6. A composition comprising (1) a potentially heat-curable resinous condensation product of ingredients comprising urea and formaldehyde and (2) an accelerator of curing of said condensation product comprising an N-diethyl chloroacetamide.

7. A resinous composition comprising a potentially heat-curable aminoplast containing an N-dialkyl chloroacetamide as a curing catalyst.

8. A resinous composition comprising a potentially heat-curable aminoplast containing an N-diethyl chloroacetamide as a curing agent.

9. A product comprising the cured resinous composition of claim 3.

10. An article of manufacture comprising the heat- and pressure-hardened molding composition of claim 13.

11. The method of curing a potentially heat-curable aminoplast which comprises incorporating in such aminoplast a small amount of a halogenated amide selected from the class consisting of alpha halogenated amides of secondary amines, beta halogenated amides of secondary amines and alpha beta halogenated amides of secondary amines, and subjecting the resulting composition to a temperature of the order of 100° to 150° C.

12. A molding composition comprising a potentially heat-curable aminoplast having incorporated therein a filler and a small amount of a curing catalyst selected from the class consisting of alpha halogenated amides of secondary amines, beta halogenated amides of secondary amines and alpha beta halogenated amides of secondary amines.

13. A composition comprising a potentially heat-curable aminoplast having incorporated therein a curing accelerator comprising a beta chlorinated amide of a secondary amine.

14. A composition comprising a potentially heat-curable aminoplast having incorporated therein a curing accelerator comprising an alpha beta chlorinated amide of a secondary amine.

15. A molded article of manufacture comprising a potentially heat-curable aminoplast which has been cured to an insoluble, infusible state with a halogenated amide selected from the class consisting of alpha halogenated amides of secondary amines, beta halogenated amides of secondary amines and alpha beta halogenated amides of secondary amines.

16. A molded article of manufacture comprising a resinous condensation product of ingredients comprising urea and formaldehyde, said condensation product being cured to an insoluble, infusible state with an N-diethyl chloroacetamide.

GAETANO F. D'ALELIO.